Dec. 29, 1953  P. GERARD ET AL  2,663,977
SYSTEM FOR CONTROLLING THE POSITION
OF A SHAFT IN ITS BEARINGS
Filed July 8, 1950  8 Sheets-Sheet 1
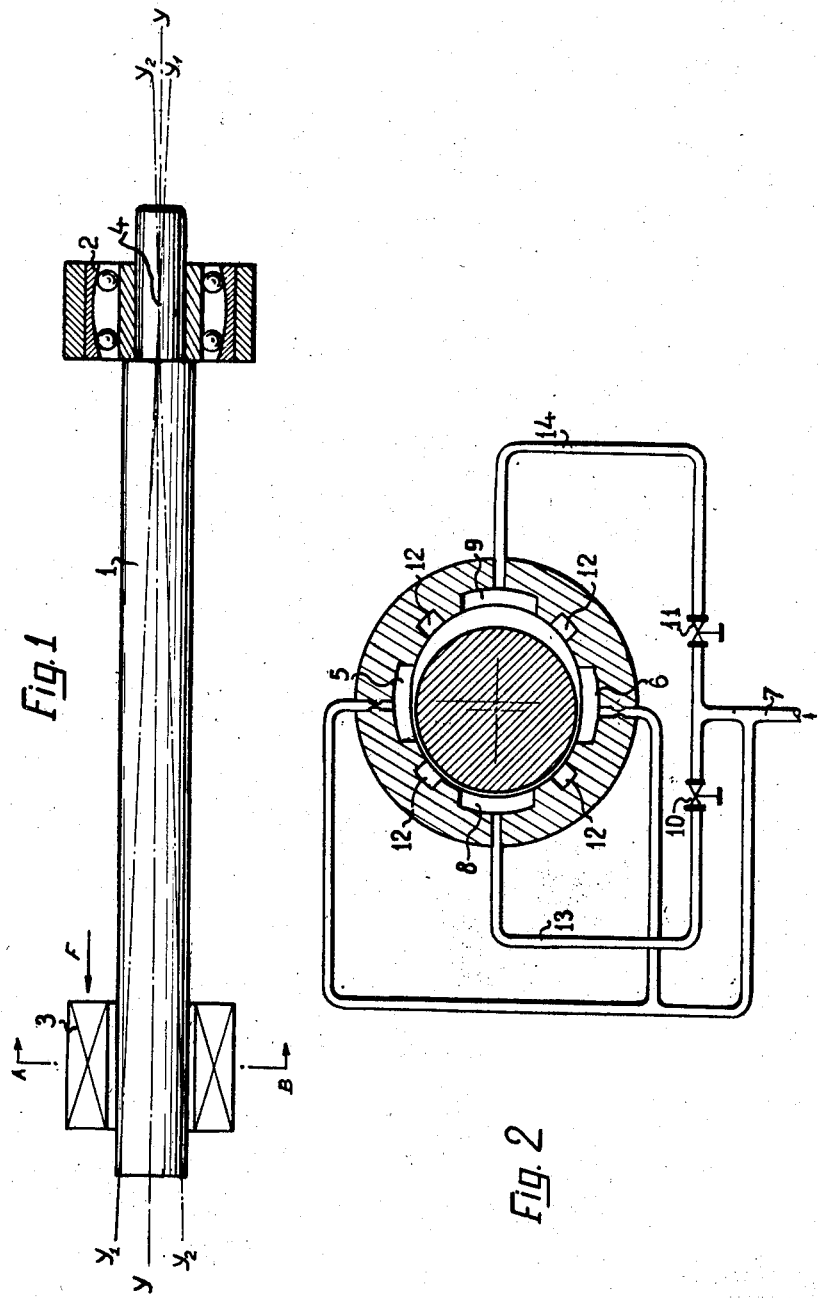
Inventors
Paul Gerard
Henri Deranne
by Brown + Seward
Attorneys Dec. 29, 1953

P. GERARD ET AL 2,663,977

SYSTEM FOR CONTROLLING THE POSITION
OF A SHAFT IN ITS BEARINGS

Filed July 8, 1950

Inventors
Paul Gerard
Henri Seranne
by Brown & Seward
Attorneys

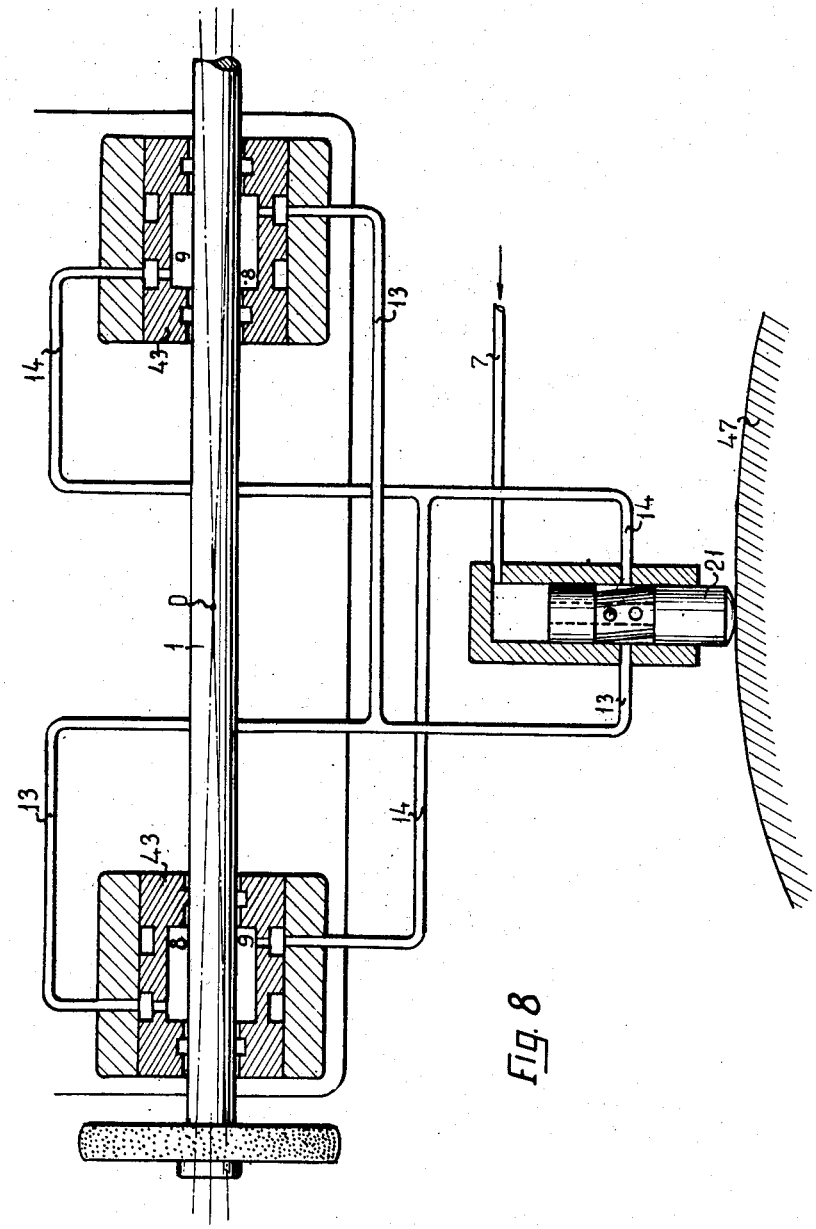

Dec. 29, 1953
P. GERARD ET AL
SYSTEM FOR CONTROLLING THE POSITION
OF A SHAFT IN ITS BEARINGS
Filed July 8, 1950
2,663,977
8 Sheets-Sheet 5
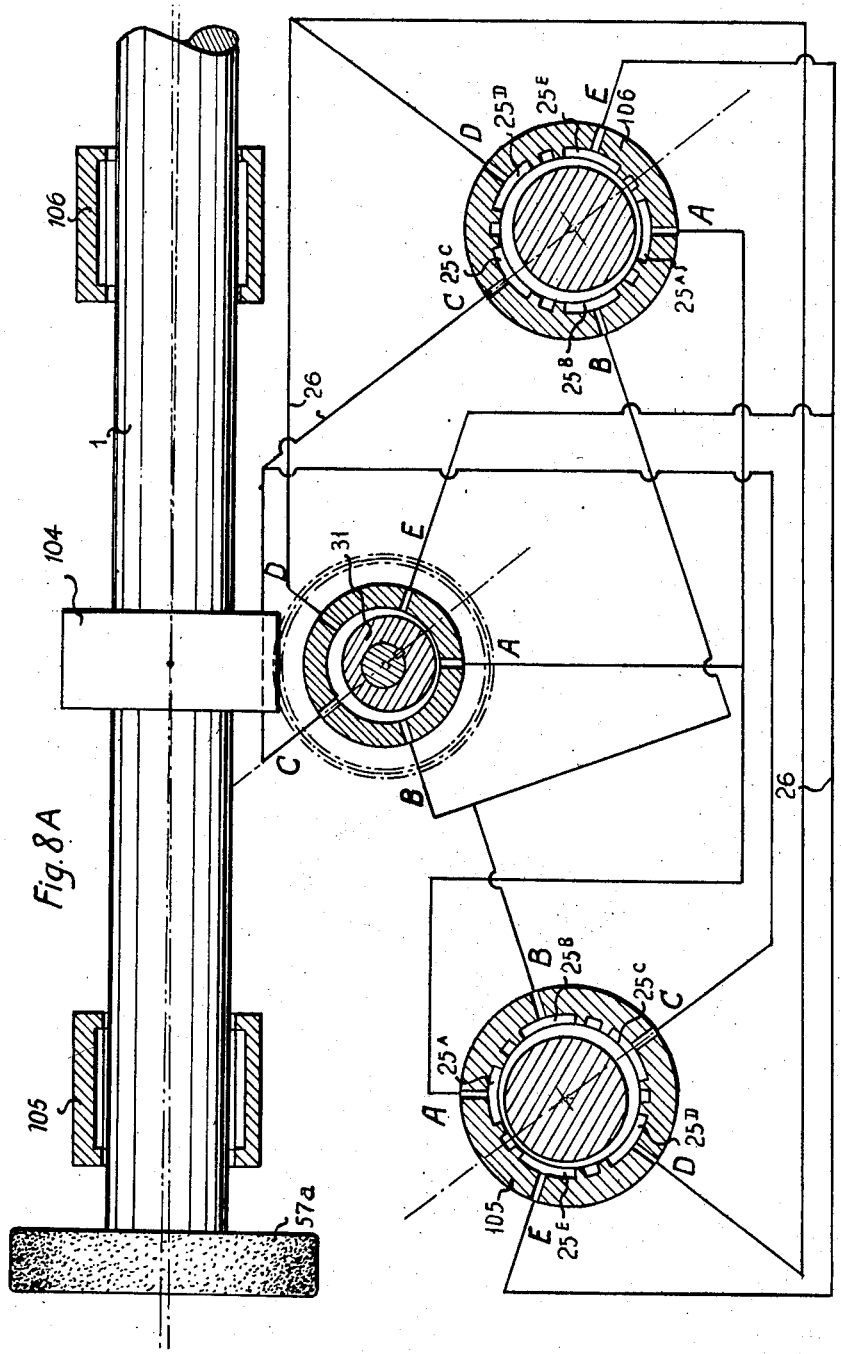
Inventors
Paul Gerard
Henri Seranne
by Brown & Seward
Attorneys

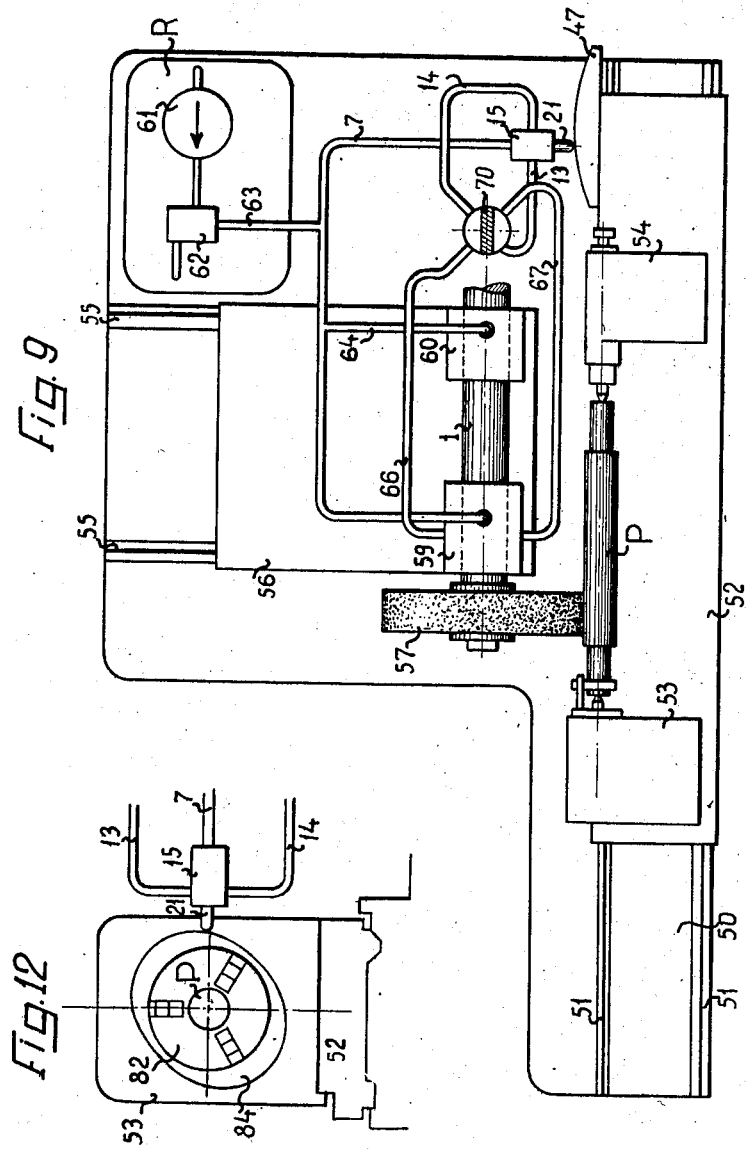

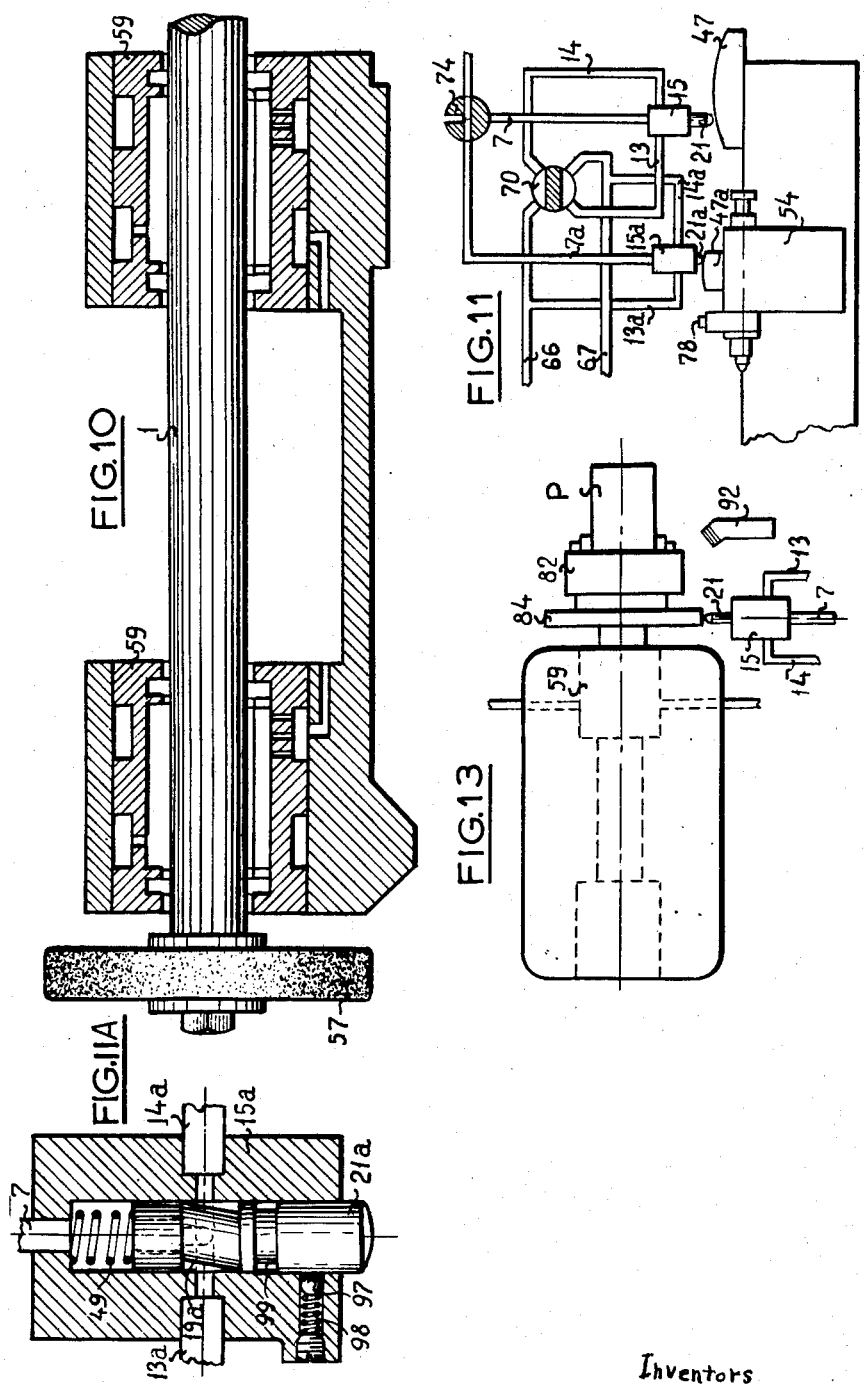

Dec. 29, 1953     P. GERARD ET AL     2,663,977
SYSTEM FOR CONTROLLING THE POSITION
OF A SHAFT IN ITS BEARINGS
Filed July 8, 1950     8 Sheets-Sheet 8

Inventors
Paul Gerard
Henri Leranne
by Brown & Seward
Attorneys

Patented Dec. 29, 1953

2,663,977

UNITED STATES PATENT OFFICE 2,663,977

SYSTEM FOR CONTROLLING THE POSITION OF A SHAFT IN ITS BEARINGS

Paul Gerard, Paris, and Henri Séranne, Villeurbanne, France, assignors to Gendron Freres, S. A., Villeurbanne, France, a company of France Application July 8, 1950, Serial No. 172,667

Claims priority, application France January 24, 1950

19 Claims. (Cl. 51—100)

This invention relates to fluid pressure control systems for shaft bearings in which said pressure fluid is conducted to the bearing surface to maintain an annular clearance between the shaft and the bearing surface.

In known bearings of this kind, it has been proposed to separately conduct fluid at substantially uniform pressure to several circumferentially and regularly spaced portions of the bearing surface in a manner to constitute uniform pressure zones around the shaft so as to create a concentric balance condition holding the shaft in a floating state, whereby a relative displacement of the shaft toward a portion of the bearing surface will automatically increase the pressure in certain of said pressure zones to counteract the forces tending to cause said relative displacement.

The primary object of the invention is to provide a fluid bearing structure of the character described with control means permitting to vary the pressure in at least one of the pressure zones so as to impose upon said shaft an unbalanced force capable of displacing the same from its normal concentric position towards a portion of the bearing surface until the pressure in at least one of the pressure zones towards which said shaft moves is sufficiently increased by said relative displacement of the shaft to counteract said force, so as to thereby maintain the shaft in a position different from its concentric position until a new different state of equilibrium of the pressures is created by said control means. By selectively varying the pressure in two opposed pressure zones, the shaft may be displaced from one side of the bearing to the opposite side in a transverse plane containing the axis of the bearing, and by providing at least two axially spaced bearing structures at least one of which has a bearing surface of the character described, it becomes possible, by selectively varying the pressure in at least two pressure zones of the bearing surface or surfaces, to obtain various complex movements of the shaft in the bearing.

Another object of the invention is to provide novel fluid pressure control means constituted by at least one distributor adapted to vary differentially or periodically, or differentially and periodically, the feeding section of at least two of said pressure zones.

Obviously, a shaft bearing of the type forming the subject matter of the invention may be employed with machine tools of various types but is particularly advantageous in contouring machines adapted to retrace a contour path on a templet.

It is, therefore, a further object of the invention to provide a combined fluid bearing and pressure fluid distributor system for the spindle of a grinding machine, said distributor comprising a rotatable slide valve actuated by a scanning member and designed so that axial displacement of the valve will cause corresponding transverse displacement of the shaft in the bearing, whereas angular adjustment of the valve will determine the length of said displacement of the shaft, and rotation of said valve may cause a corresponding rotational movement of the axis of the shaft about the axis of the bearing, it being understood that any complex movement of the slide valve will result in corresponding complex movement of the shaft within the bearing and that relatively considerable displacements of the scanning member may result in very small displacements of the shaft so that the accuracy with which the work piece is formed may be increased to about 1 micron or more.

Other objects and advantages of the invention will appear from the following description with reference to the accompanying drawings in which some embodiments of the invention have been shown as a mere illustration.

In these drawings:

Fig. 1 is a diagrammatic horizontal axial section of a shaft journalled in two bearings, one of which is a fluid bearing provided with a system for controlling the feeding cross sections of its zones.

Fig. 2 is a cross-sectional view of a fluid bearing and of the means to control the feeding duct cross-sections of its zones along line A—B of Fig. 1.

Fig. 8 is a horizontal axial section of a shaft journalled in two fluid bearings, provided with pressure control means in diametrically opposed zones, by means of one single distributor, the movable part of which constitutes a member scanning on a templet.

Fig. 8A shows a shaft journalled in two fluid bearings periodically controlled by means of a distributor rotatively driven from said shaft.

Fig. 9 shows a machine for grinding revolution bodies, having incurved generatrices in which the grinding-wheel shaft is journalled in two bearings, one of which is provided with control means comprising a distributor, a scanning member and a templet integral with the work-carriage.

Fig. 10 is a section showing in detail the bearings of the grinding-wheel shaft of Fig. 9.

Fig. 11 is a partial view of an alternative embodiment of the machine shown in Fig. 9, comprising an auxiliary scanning member for the diamond-shaping of the grinding-wheel.

Fig. 11A is an axial section of the diamond-shaping scanning member of Fig. 11.

Fig. 12 is an elevational partial view of a machine for grinding non-revolution surfaces provided with means to control the position of the part-driving spindle according to the invention.

Fig. 13 is a plan part view of a machine also adapted to grind non-revolution surfaces and provided with the system according to the invention.

Figure 4:
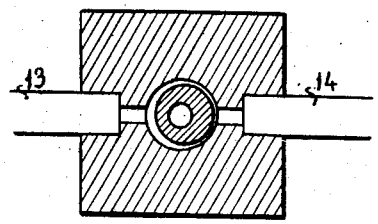
Fig. 4 is a section along axis 4—4 of Fig. 3.

It will be noted that, in most instances, the clearance between the fixed and movable elements of the bearings has been considerably exaggerated in the drawings, for clarity of illustration.

Referring first to Fig. 1, there is shown at 1 a shaft journalled in two bearings 2 and 3. In this example, bearing 2 is a knee-joint mechanical bearing in which the shaft axis is free to move angularly about point 4 located on the bearing axis.

Bearing 3 is a fluid bearing.

According to a first embodiment, bearing 3 (see Fig. 2) comprises two feeding zones 5 and 6 fed from a suitable pressure fluid source (not shown) through a duct 7 and two chambers 8 and 9 fed by the same duct 7 but through two devices 10 and 11 capable of varying the feeding sections. There is shown at 12 longitudinal outlet grooves for the pressure fluid.

It will be understood that when the feeding sections of ducts 13 and 14 which feed chambers 8 and 9, respectively, are varied, e. g. by increasing the feeding cross-section of duct 14, while decreasing that of duct 13, the shaft is imparted under the control of devices 10 and 11 with a leftwards displacement (in Fig. 2) which results in shifting said shaft with respect to the common axis of bearings 2 and 3. Assuming that chambers 5 and 6 have a vertical axis while chambers 8 and 9 have a horizontal axis, it will be seen that axis Y—Y of shaft 1 (see Fig. 1) will be displaced with respect to the common axis of bearings 2 and 3 to come into position $Y_1$—$Y_1$. When, conversely, the feeding section of zone 8 is increased while that of zone 9 is simultaneously decreased, axis Y—Y of shaft 1 will come into position $Y_2$—$Y_2$ (see Fig. 1).

By using the control means shown in Fig. 2, the shaft being journalled in bearings of the type of Fig. 1, said shaft will be easily brought into any desired angular position with respect to the common axis of the bearings in that horizontal plane which contains said common axis, position in which it will be maintained during any desired time, said shaft then rotating about its off-set axis without risking that the stresses exerted upon the shaft vary in any noticeable manner the position of its axis with respect to the common axis of the bearings.

Figure 3A:
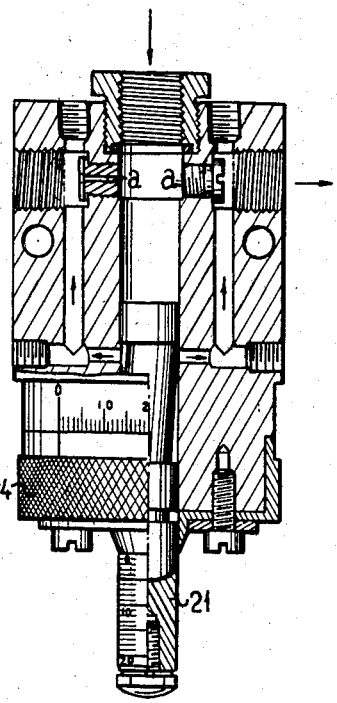
Fig. 3A is an elevation with partial section of an embodiment of the scanning member of the distributor shown in Fig. 3.
Figure 3:
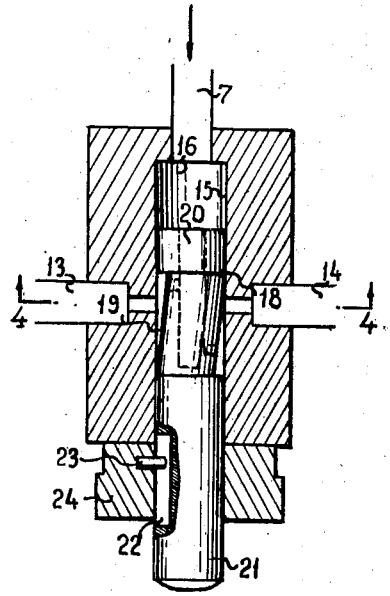
Fig. 3 is an axial section with partial elevation of a distributor capable of differentially controlling the feeding ducts of the two diametrically opposed zones of the bearing of Fig. 2.

In Figs. 3 and 4 is shown an embodiment of a distributor according to the invention permitting controlling the feeding sections of ducts 13 and 14 of Fig. 2. As described above, it is suitable to control said sections so as to meet the three desired conditions, namely that the variations are proportioned to the displacements of the control member, that they are in opposite directions and simultaneous, and that they are such that the sum of the feeding cross-section remains constant. The distributor shown in Figs. 3 and 4 is capable of perfectly meeting said three conditions. This distributor is constituted by a body 15 in which is provided a bore 16 fed through a duct 7 with a pressure fluid supplied by a suitable source (not shown), the two ducts 13 and 14 leading from diametrically opposed points of said bore. Said distributor thus assumes in fact the functions of both cocks 10 and 11 (see Fig. 2).

In bore 16 is mounted a slide valve 18 having a profiled portion 19. The pressure fluid is brought through a passage 20 into the peripheral zone of the profiled portion 19. Said slide valve comprises an extension constituted by a rod 21 which either constitutes itself the scanning member according to the invention or alternatively a part solid with such a scanning member.

A longitudinal groove 22 is provided on the periphery of rod 21 and a lug 23 integral with a knurled ring 24 is engaged in said groove so that when said knurled ring is rotated, this motion results in a rotation of rod 21 around its own axis. Lug 23 is however capable of sliding freely in groove 22 which permits a longitudinal displacement of rod 21 in either direction within the limits of the length of said groove 22.

The axial displacements of the scanning member 21 due to the scanning of a suitable templet cause, thanks to the shape of the profiled portion 19, equal and opposite variations of the feeding cross-sections of ducts 13 and 14.

Moreover, the rotation of the knurled ring 24 permits giving the profiled portion 19 any angular position so that the above-mentioned section variations may be given any desired value for a well-defined displacement of rod 21.

In particular, if the profiled portion 19 is set into a position perpendicular to that of Fig. 3, both feeding sections of ducts 13 and 14 are made equal to each other, whichever may be the axial position of slide valve 18, so that the controlled shaft then assumes a fixed position.

In Fig. 3A, has been shown a constructive embodiment of the slide valve of Fig. 3 completed by a graduated scale for measuring the displacements of the knuled ring 24 which permits adjusting with accuracy the sensitivity of the apparatus and by another graduated scale along rod 21 to indicate at any instant the axial position of the scanning member. The distributor of Fig. 3A further comprises safety nozzles $a$, mounted so as to connect the inlet duct 7 directly with the outlet ducts 13 and 14 leading to the pressure zones 8 and 9, respectively, so that these zones will be always supplied through the by-pass nozzles a with a small amount of pressure fluid independently of the position of slide valve 18 to thereby prevent metal-to-metal contact between shaft 1 and a portion of the bearing surface when one of the ducts 13 and 14 should be completely closed by the slide valve 18, that is to say when the supply of pressure fluid through the distributor to one of the pressure zones 8 and 9 is interrupted in response to a corresponding position of the slide valve.

Figure 5:
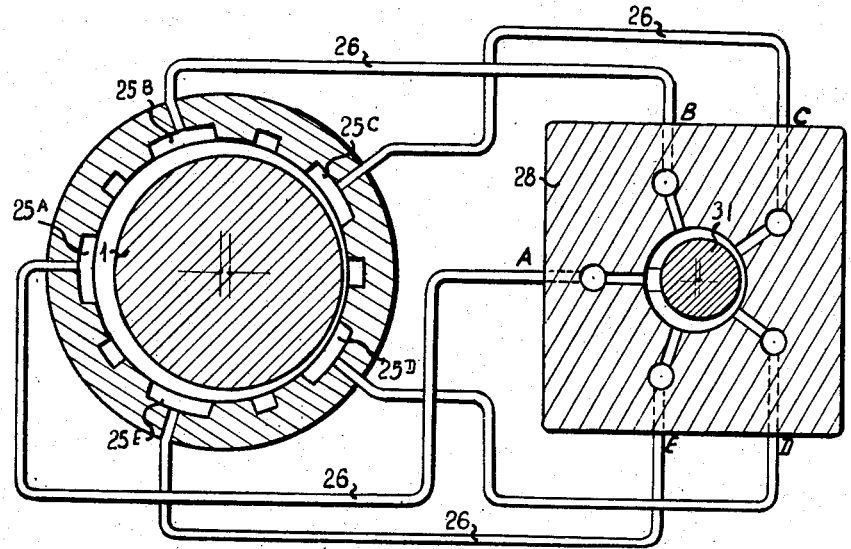
Fig. 5 is a cross-sectional view of a shaft bearing of the type shown in Fig. 2 but comprising five pressure zones symmetrically disposed around the shaft, and of a distributor permitting periodic control of the pressure in said zones.

According to another embodiment shown in Fig. 5, the fluid bearing 3 (Fig. 1) comprises five periodically controlled feeding zones 25A, 25B, 25C, 25D, 25E fed with a pressure fluid through suitable ducts 26 by a five-way distributor which periodically controls the feeding cross-sections of the five zones 25.

Figure 6:
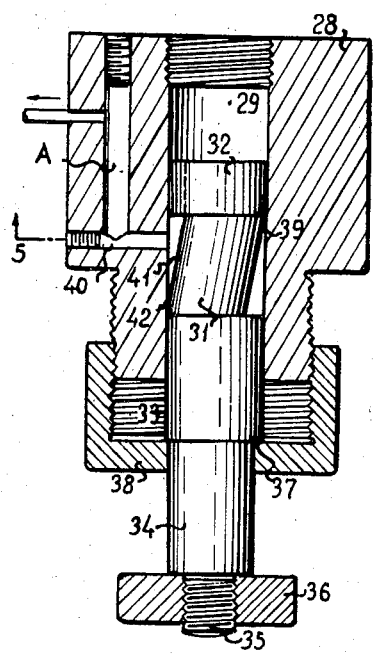
Fig. 6 is an axial section of the distributor shown in Fig. 5.
Figure 7:
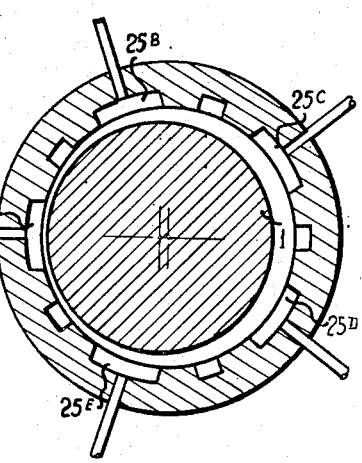
Fig. 7 is a cross-section of the bearing shown in Fig. 5, but in which the shaft is located in a position diametrically opposed to that of Fig. 5.

The distributor of Fig. 5 is shown in axial section in Fig. 6. In this figure, there is shown at 28 the distributor body which is provided with a cylindrical axial bore 29 in which is slidably and rotatively mounted a slide valve comprising a profiled portion 31 comprised between two cylindrical portions 32 and 33. Said slide valve comprises an extension constituted by a rod 34 screwed at 35 in a roller 36 used for rotatively driving the slide valve. Rod 34 has a diameter smaller than the lower cylindrical portion 33 of the slide valve which determines an annular shouldering 37 upon which a threaded ring 38 screwed on the distributor body 28 is capable of acting.

The angular space between portion 31 and the wall of bore 29 communicates with the five ports A, B, C, D, E of the distributor (Fig. 5) connected through the above-mentioned ducts 26 with feeding zones 25 of the bearing indicated by the same reference letters. It may be seen that the angular positions of the feeding zones 25A to 25E, respectively, correspond to those of ports A to E of the distributor.

It will be easily understood that the rotation of slide valve 31 about its axis causes in the bearing a corresponding rotation of the shaft axis around the bearing axis. The threaded ring 38 permits adjusting at will the axial position of the slide valve 31, which permits determining the magnitude of the eccenric shift of the shaft in the bearing.

When the slide valve is axially displaced in bore 29 of the distributor by means of ring 38 so that an annular portion 39 of the profiled member 31 comes to lie adjacent the passages 40 giving access to the above-mentioned ports A, B, C, D, E, a maximum eccentric shift is obtained in the bearing, the displacements of the shaft occurring in phase with those of the slide valve, as shown in Fig. 5. However, when the annular portion 41 of the profiled member 31 is brought adjacent the passages 40, the rotation of said slide valve will cause no displacement of shaft 1 in its bearing, since the shaft is then in its concentric position. Finally, when the annular portion 42 is located at the level of passages 40, a maximum eccentric displacement of the shaft is obtained in a direction opposite to that in which the shaft is displaced when the annular portion 39 is adjacent passages 40. If slide valve 31, instead of being given only the rotary motion indicated above, is also axially displaced in bore 29 by means of ring 38, it will be possible to obtain corresponding complex displacements according to any desired law, of the shaft in its bearing.

The above-described examples refer to a first embodiment of the invention in which one bearing only is controlled.

Figs. 8 and 8A refer respectively to a second and third embodiment of the invention in which both bearings of the shaft are of the controlled type and similar to bearing 3 (Fig. 1).

In the constructive embodiment of Fig. 8, the shaft may be shifted in its two bearings which are of the type of Fig. 2, i. e. its axis may be displaced in a plane about a point located between the two bearings and on their common axis. In the embodiment of Fig. 8A, the two bearings are of the periodic-control type shown in Fig. 5 and the shaft can be imparted with a precessional motion around the common axis of the bearings, the axis of said shaft describing a cone, the apex of which is located between the two bearings. These two embodiments comprise one single distributor controlling simultaneously both bearings under the action of a member scanning a templet in the case of Fig. 8 and under the control of the shaft itself in the case of Fig. 8A. It is obvious that a separate distributor might be provided for each bearing and that, moreover, one of the shaft bearings might be of the type shown in Fig. 8, while the other bearing would be of the type shown in Fig. 8A. In this case, the shaft axis would describe a conoïd surface. Moreover, instead of causing the shaft axis to describe a cone around the common axis of the bearings, as in the case of Fig. 8A, this action being obtained by a control with a relative phase-shift by 180° in the two bearings, it is obvious that said shaft axis might be caused to describe either a cylindrical surface by a control in phase of both bearings or a hyperboloïd surface by a simultaneous but phase-shifted control of both bearings.

In the example shown in Fig. 8A, shaft 1 carries a grinding-wheel 51a and the reduction ratio of gears 104 is high so that the precessional motion of the shaft is slow with respect to its rotational motion. In the constructive embodiment shown in Fig. 8, shaft 1 is journalled in two fluid bearings 43 of the type shown diagrammatically at 3 (Fig. 1) and in detail in Fig. 2, each fluid bearing comprising two diametrically opposed pressure-control feeding zones 8 and 9. Said zones are connected in parallel through two ducts 13 and 14 with a distributor provided with a profiled slide valve similar to that previously described with reference to Figs. 3 and 4.

It will be understood that when member 21 is scanning templet 47, it moves axially as a function of the curvature of the templet profile. Thanks to the shape of the profiled slide valve, the cross-sections of the passages giving access to ducts 13 and 14 vary in the same extent but in opposite directions, so that e. g. the feeding cross-section of zones 9 of both bearings increases, while that of the feeding zones 8 of both bearings is reduced in the same extent. It will be understood that when the slide valve slides in the bore of the distributor, the axis of shaft 1 is displaced about point 0 located on the common axis of said bearings and substantially mid-way between the same.

In the embodiment shown in Fig. 8A, shaft 1 is linked with a rotor 31 of a rotary distributor through a suitable helical gear train 104 having such a ratio that rotor 31 rotates far slower than shaft 1. The rotary distributor controlled by rotor 31 comprises five ways A, B, C, D, E, each leading through suitable ducts 26 to the inlets indicated by the same reference letters A, B, C, D, E of the feeding zones 25A to 25E of bearings 105 and 106 in which shaft 1 is journalled.

In the example shown, the arrangement is such that the displacements of the shaft in bearing 106 occur in phase with the rotation of rotor 31, while the displacements of said shaft in bearing 105 occur with a phase-shift by 180° with respect to the rotation of said rotor. Thus, the rotation axis of shaft 1 is imparted with a slow precessional motion around the common axis of both bearings and said rotation axis describes a conical surface, the apex of which is located midway between bearings 105 and 106. Gear 104 is also located mid-way between the bearings, the spacing between the axes of the two pinions being thus but slightly influenced by the precessional motion of the shaft.

Fig. 9 shows a machine for grinding revolution bodies, the generatrices of which are incurved, said machine being provided with the control system according to the invention. Said machine comprises a frame 50 carrying slides 51 on which is slidably mounted a table 52 carrying in turn a work-headstock 53 which supports in conjunction with a tailstock 54 the work P. Moreover, headstock 53 rotatively drives said work. The grinding-wheel carriage 56 is mounted on a second pair of slides 55 also carried by frame 50. Said carriage supports in turn the grinding-wheel spindle 1 which is journalled in bearings 59 and 60 and other elements (not shown) imparting said spindle 1 with its rotary motion. The grinding-wheel proper is shown at 57.

Bearing 60 is of any suitable type. It may be either a mechanical bearing, e. g. of the knee-joint type or a fluid bearing such as described in the above-mentioned patent applications and as shown in the drawings.

Bearing 59 is provided with a control system of the position of the grinding-wheel spindle 1 according to the invention.

In Fig. 10 are shown in detail two controlled bearings similar to 59 and constituting an alternative mode of bearing of spindle 1 shown in Fig. 9.

A pump 61 and a regulating valve 62 discharge into ducts 63 and 7 a fluid under a substantially constant pressure. The fluid tank is shown at R. A duct 64 branched off duct 63 leads the constant pressure fluid to bearing 60.

In the example shown, bearing 59 is of the type shown diagrammatically at 3 (Fig. 1) and in detail in Fig. 2. Said bearing comprises four feeding zones, viz.: two feeding zones of vertical axis fed from an annular chamber fed in turn through the constant section duct 63 and two zones of horizontal axis provided with a variable feeding and connected with ducts 66 and 67 which may be set into communication with two other ducts 13 and 14 by means of a rotary distributor 70. When the rotary member of distributor 70 is in the position shown in Fig. 9, it may be seen that duct 14 communicates with duct 66, while duct 13 communicates with duct 67. Conversely, if said rotary member is brought into a position perpendicular to that shown, duct 14 is set into communication with duct 67 while duct 13 is set into communication with duct 66. This arrangement permits reversing the direction of the transaxial shift imparted to the grinding-wheel spindle 1. Thus, in one position of the rotary distributor 70, the grinding-wheel is imparted with a displacement corresponding to the outline of templet 47 and incurved in the same direction as said outline, while in the other position of said distributor, the grinding-wheel is imparted with a displacement corresponding to the above-mentioned outline but incurved in the opposite direction.

The cross-sections of ducts 13 and 14 may be varied at will and in opposite directions by means of a distributor 15 similar to that shown in Fig. 3. Said distributor is controlled by a scanning member 21 sweeping on templet 47.

It will be understood that thanks to the invention, it is possible to obtain revolution bodies having incurved generatrices with the greatest accuracy, due to the fact that the only element to be displaced is the spindle carrying the grinding-wheel and that the displacements of said spindle may be controlled with accuracy and sensitivity. The accuracy and sensitivity are further increased thanks to the sensitivity-adjustment facility of distributor 15. It is thus possible to use a templet having a noticeably incurved outline to obtain a desired piece outline corresponding to said templet outline but only slightly incurved.

In the alternative embodiment of the above described grinding-machine shown in Fig. 11, there is provided, apart from the parts heretofore mentioned, an auxiliary scanning member 21a sweeping on an auxiliary templet 47a carried by the tailstock 54 which also carries a diamond 78. The device of Fig. 11 is also provided with a three-way cock 74 permitting feeding at will either through a duct 7 the normal distributor 15 controlled by the main scanning member 21 sweeping on the main templet 47, in order to grind revolution pieces as desired or through a duct 7a the auxiliary distributor 15a to suitably shape the grinding-wheel. The auxiliary distributor 15a varies, under the control of scanning member 21a in opposite directions and in the same extent, the cross-sections of ducts 13a and 14a connected with ducts 66 and 67, respectively. This arrangement permits also shaping the grinding-wheel by means of diamond 78 so as to give the periphery of said grinding-wheel the desired outline which is determined by the templet outline 47a. The templet outline 47a is so designed that the grinding-wheel, whatever may be the inclination of the spindle, never presents to the surface to be ground a leading cutting edge. The machine modified as shown in Fig. 11 thus permits, without any part removal, by a mere cock control, to shape the grinding wheel with the above-mentioned diamond at any desired time. Suitable means are provided to avoid any undesired communication in the scanning member, which is then at rest, between the two zones fed through the variable section of the scanning member when operative. In the embodiment shown in Figure 11A, said means are constituted by an abutment 97 maintained against rod 21a by the spring 98. When rod 21a is at rest, the groove 99 comes opposite the abutment 97 which is moved by spring 98 into the said groove, thus releasably locating the member 21a in the position in which its upper cylindrical part interrupts communication between the said two zones. The diamond-shaping distributor may be constituted, as shown in Fig. 11A, in the same manner as the distributor of Fig. 3, but it is simplified in that it does not comprise any sensitivity-adjustment means; on the other hand, it is provided with a drawback spring 49.

Fig. 12 is a part view of a machine for grinding non-revolution surfaces in which the position of the grinding-wheel spindle is controlled by the system according to the invention. There is shown at 84 a rotary templet the outline of which, e. g. oval, is used to determine the section to be given to the work. A scanning member 21 sweeps on said outline which acts as a cam and controls a distributor 15 of the type described above (Fig. 3) which varies in opposite directions and in the same extent the cross-sections of ducts 13 and 14. The feeding of distributor 15 is ensured by a duct 7. The work P, mounted on a mandrel 82 is carried by a work-holding headstock 53 and is rotatively fast with the above-mentioned templet or cam 84. The scanning member 21 is solid with table 52. It will be understood that when mandrel 82, work P and cam 84 are rotating, the displacements imparted to the scanning member 21 cause corresponding displacements of the grinding-wheel shaft in its bearing, so that the part obtained has a cross-section corresponding to that of cam 84.

In the alternative embodiment shown in Fig. 13, the machine still comprises a rotary templet 84 but, in this modification, it is the front bearing 59 of the work-holding headstock which is controlled by the distributor. Since the controlled bearing which causes the generation of the desired outline is that of the work-holding headstock, the grinding-wheel may be substituted by a suitable lathe-tool such as 92. The arrangement of the machine of Fig. 13 is otherwise similar to that of Fig. 12. It will be also possible to provide two similar controlled bearings for the work-holding headstock of Fig. 13, said bearings being fed by one single scanning member. It will be evident that the displacements of the shaft, referred to above, can actually amount to a few thousandths of an inch maximum, but shaping even on such a minute scale is frequently important and the apparatus shown herein permits effecting the desired result with extreme accuracy. As previously noted, the displacements are shown in the drawings on an exaggerated scale in order to make them readily visible.

Figure 15:
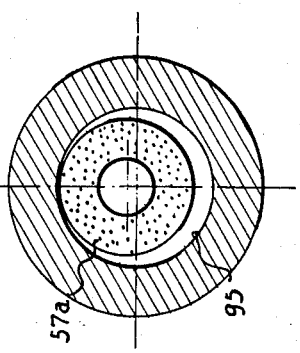
Fig. 15 is an end view of the spindle of Fig. 14.
Figure 14:
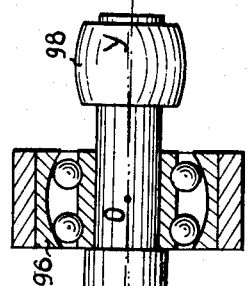
Fig. 14 shows a bore-grinding spindle journalled in bearings, one of which is provided with control means according to the invention.

Figs. 14 and 15 show another embodiment of the invention, used with a spindle for finishing bores. In these figures, there is shown at 1 a spindle carrying at one end a suitable tool such as a grinding-wheel 57a adapted to grind a bore such as 95. At its end opposite to grinding-wheel 57a, spindle 1 is journalled in a bearing of any suitable type which may be e. g. a knee-joint ball bearing 96, but which might be also a fluid bearing such as described in the above-mentioned patent applications. Towards its end carrying grinding-wheel 57a, spindle 1 is journalled in a bearing 97 provided with periodically controlled feeding zones. When the feeding cross-sections of the different zones of bearing 97 are varied periodically, as described above, axis Y—Y of said shaft describes a conical surface around the common axis of bearings 96 and 97 and grinding-wheel 57a which rotates besides around said axis Y—Y successively attacks all points of the periphery of bore 95 and grinds the same with accuracy. The driving pulley of the spindle is shown at 98.

The amplitude of the precessional motion of spindle 1 is progressively increased and the bore thus machined assumes a diameter which is not that of the grinder but that of the envelope surface of the various positions of the grinder in space. It suffices to act upon the rotary distributor (see Fig. 6) to reverse the direction of precessional motion of the spindle axis so as to machine the bore in the opposite direction.

Figure 17:
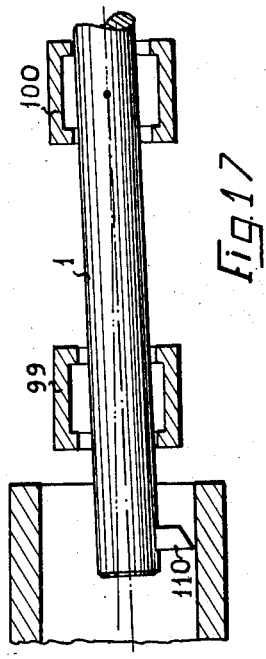
Figs. 16 and 17 show the part-driving spindle of a jig-borer, said spindle being journalled in two bearings, one of which is controlled according to the invention.
Figure 16:
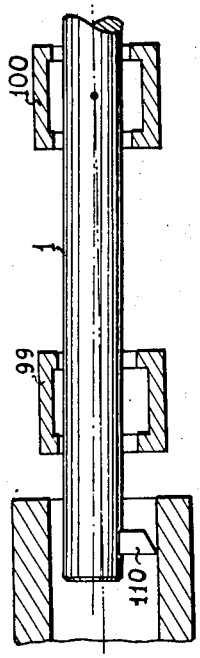

Figs. 16 and 17 show another embodiment adapted to a jig-borer in which the upper bearing 100 of spindle 1 is of a normal fluid type, while the lower bearing 99 is provided with controlled feeding zones according to the invention, capable of imparting spindle 1 with a precessional motion.

In this embodiment, the slide valve is so linked with the spindle that both elements rotate at the same speed. The work begins as shown in Fig. 16 with a transaxial shift opposite to the direction of tool 110; then, said shift is progressively decreased down to zero, after which the spindle is shifted in the opposite direction and brought progressively into the position shown in Fig. 17.

It is thus possible to make a cylindrical bore with a high accuracy. This device permits adjusting the diameter of the bore obtained during the working of the machine. For example, the jig-borer spindle shown in Figs. 16 and 17 may be designed according to the constructive embodiment of Fig. 8A, except that the grinding-wheel would then be substituted by a suitable jig-borer tool and that the ratio of the gear train interposed between the spindle and the rotor of the rotary distributor would then correspond to a transmission ratio equal to unity, so that the spindle describes one precessional cycle for each rotational turn.

What is claimed is:

1. In combination, a rotatable shaft, at least two bearing structures to journal said shaft, one at least of said bearing structures being of the type in which the shaft is floatably supported in the stationary bearing surface, the same comprising a plurality of circumferentially spaced pressure zones separated by outlet grooves and at least two of which zones are diametrically opposed, means to feed separately pressure fluid to each of said zones and control means adapted to act differentially upon the feeding of two diametrically opposed zones of at least one of said bearing structures, so as to shift at will said shaft in respect to the longitudinal common axis of said bearing structures by a displacement in a plane containing said common axis and the diametral direction passing through the centers of said two feeding zones.

2. In combination, a rotatable shaft, at least two bearing structures to journal said shaft, one at least of said bearing structures being of the type in which the shaft is floatably supported in the stationary bearing surface, the same comprising a plurality of circumferentially spaced pressure zones separated by outlet grooves, means to feed separately pressure fluid to each of said zones and means to control at will the feeding of at least three of said zones of at least one of said bearing structures, so as to shift at will said shaft in respect to the longitudinal common axis of said bearing structures, by a displacement in the plane containing said axis and the resultant of the pressures in said controlled zones.

3. In combination, a rotatable shaft, at least two bearing structures to journal said shaft, one at least of said bearing structures being of the type in which the shaft is floatably supported in the stationary bearing surface, the same comprising a plurality of circumferentially spaced pressure zones separated by outlet grooves, means to feed separately pressure fluid to each of said zones and means to control periodically the feeding of at least three of said zones, so as to shift at will said shaft in respect to the longitudinal common axis of said bearing structures, so as to obtain complex movements of said shaft and, in particular, a precessional motion around said common axis.

4. In combination with a fluid bearing for a shaft rotatable in a stationary support, comprising a plurality of circumferentially spaced pressure zones in the stationary bearing surface, separated by outlet grooves at least two of which zones are diametrically opposed, and means including feeding ducts to feed separately pressure fluid to each of said zones, a distributor adapted to differentially control the feeding of two diametrically opposed pressure zones, by varying simultaneously and in opposite directions the cross-sections of corresponding feeding ducts in such a manner that said variations are a function of the displacements of its movable control member, and means to adjust the ratio between the displacements of said movable control member and the variations of said cross-sections.

5. In combination with a fluid bearing for a shaft rotatable in a stationary support comprising a plurality of circumferentially spaced pressure zones in the stationary bearing surface, separated by outlet grooves at least two of which zones are diametrically opposed, and means including feeding ducts to feed separately pressure fluid to each of said zones, a distributor adapted to differentially control the feeding of two diametrically opposed pressure zones, by varying the cross-sections of corresponding feeding ducts proportionally to the displacements of its movable control member, in opposite directions, simultaneously and so that the sum of said cross-sections remains always constant, said distributor comprising a body, a cylindrical bore in said body, two diametrically opposed passages leading from said bore, each towards a duct feeding one of said pressure zones, a pressure fluid inlet to said bore and a movable valve member mounted in said bore and slidably displaceable by a scanning member, said movable valve member having a shape so designed that its axial displacement in either direction increases the cross-section of one of said ducts while decreasing to the same extent the cross-section of the other.

6. In combination with a fluid bearing for a shaft rotatable in a stationary support, comprising a plurality of circumferentially spaced pressure zones in the stationary bearing surface, separated by outlet grooves at least two of which zones are diametrically opposed, and means including feeding ducts to feed separately pressure fluid to each of said zones, a distributor adapted to differentially control the feeding of two diametrically opposed pressure zones, by varying the cross-sections of corresponding feeding ducts proportionally to the displacements of its movable control member, in opposite directions, simultaneously and so that the sum of said cross-sections remains always constant, and means to adjust the ratio between the displacements of said movable control member and the variations of said sections, said distributor comprising a body, a cylindrical bore in said body, two diametrically opposed passages leading from said bore, each towards a duct feeding one of said pressure zones, a pressure fluid inlet to said bore and a movable valve member mounted in said bore to be slidably displaceable by a scanning member and angularly displaceable for adjusting at will said ratio, said movable valve member having a shape so designed that its axial displacement in one or the other direction increases the cross-section of one or the other of said ducts while decreasing, to the same extent, the cross-section of the other, whilst the angular displacement of said movable valve member produces simultaneously and in opposite directions a variation of said cross-sections, the sum of said cross-sections always remaining constant.

7. In combination with a fluid bearing for a shaft rotatable in a stationary support, comprising a plurality of circumferentially spaced pressure zones in the stationary bearing surface separated by outlet grooves and means to feed separately pressure fluid to each of said zones, a distributor to control periodically the feeding of at least three of said zones by varying periodically the cross-sections of feeding ducts of said zones, said distributor comprising a body provided with a bore, a movable valve member rotatably mounted in said bore, a pressure fluid inlet in said bore, radial passages leading from said bore towards each of said feeding ducts, the angular position of said radial passages corresponding to the angular position of said pressure zones and means to rotate said movable valve member, whereby the cross-sections of said ducts are periodically varied.

8. In combination with a fluid bearing for a shaft rotatable in a stationary support, comprising a plurality of circumferentially spaced pressure zones in the stationary bearing surface separated by outlet grooves and means to feed separately pressure fluid to each of said zones, a distributor to control periodically the feeding of at least three of said zones by varying periodically the cross-sections of feeding ducts of said zones, said distributor comprising a body provided with a bore, a movable valve member slidably and rotatably mounted in said bore, a pressure fluid inlet in said bore, radial passages leading from said bore towards each of said feeding ducts, the angular position of said radial passages in the distributor corresponding to the angular position of said pressure zones in said bearing surfaces and means to rotate said movable valve member, whereby the cross-sections of said ducts are periodically varied, said movable valve member being so designed that in its axial mid-position its rotation produces no variation of the cross-sections of said ducts, in one of its axial end positions, its rotation produces a maximum periodical variation of said ducts cross-sections in phase with the rotation of said movable valve member and in the opposite axial end position, its rotation produces still a maximum periodical variation of said ducts cross-sections, but with a 180° phase shift, whereby said axial adjustment provides every desired periodical variation of the pressures in said pressure zones of said bearing.

9. The combination of claim 8 which includes a driving connection between said rotatable shaft and said movable valve member.

10. A grinding machine adapted to machine revolution parts, the generatrices of which are slightly cambered, comprising a work piece carrier, a grinding wheel carrier including a spindle mounted in two bearings at least one of which comprises a plurality of circumferentially spaced pressure zones separated by outlet grooves, a grinding wheel carried by said spindle, means to feed separately pressure fluid to each of said zones, a distributor controlling the cross-section of at least one of said feeding ducts, a slidable valve member in said distributor, the axial position of which controls said cross-section of said ducts, a templet rigid with said work piece carrier and a scanning member cooperating with said templet to actuate said slidable valve member.

11. A grinding machine adapted to machine revolution parts, the generatrices of which are slightly cambered, comprising a work piece carrier, a grinding wheel carrier including a spindle mounted in two bearings at least one of which comprises a plurality of circumferentially spaced pressure zones separated by outlet grooves and at least two of which are diametrically opposed, a grinding wheel carried by said spindle, means including feeding ducts to feed separately pressure fluid to each of said zones, a distributor controlling differentially the cross-sections of the ducts feeding two diametrically opposed pressure zones of said bearing, a slidable valve member in said distributor, the axial position of which controls said cross-sections of said ducts, a templet rigid with said work piece carrier and a scanning member cooperating with said templet to actuate said slidable valve member.

12. A grinding machine according to claim 11 further comprising a distributor valve to reverse the direction of the axial shift imparted to the grinding wheel spindle so as to obtain at will a concave or a convex part with a same templet.

13. A bore grinding spindle comprising a tool carrying shaft mounted in two bearings at least one of which comprises a plurality of circumferentially spaced pressure zones separated by outlet grooves, means to feed separately pressure fluid to each of said zones, and a distributor to control periodically the feeding of at least three of said zones, so as to impart said shaft with a precessional motion around the common axis of said bearings.

14. A jig-borer comprising a tool carrying shaft mounted in two bearings at least one of which comprises a plurality of circumferentially spaced pressure zones separated by outlet grooves, means to feed separately pressure fluid to each of said zones, a distributor to control periodically the feeding of at least three of said zones, so as to impart said shaft with a precessional motion around the common axis of said bearings, and means rotatively fast with shaft to rotate said distributor with such a relative speed with respect thereof that each cycle of said shaft precessional motion corresponds to one revolution of the same.

15. In a machine-tool of the type comprising a work-piece carrier, a tool-carrier and means including at least one driving shaft to create a relative motion including a rotation component between said tool and work-piece to machine the latter, the combination with at least two coaxial bearings for said shaft, one at least of said bearings being of the type in which the shaft is floatably supported by pressure fluid in a stationary bearing surface, the same comprising a plurality of pressure zones separated by outlet grooves, of means to feed separately pressure fluid to each of said zones, a distributor operatively connected with one of said carriers and having a movable member to control the feeding of at least one of said pressure zones and means to actuate said movable member to thereby shift the axis of said shaft with respect to the common axis of said bearings so as to create a fine additional component in said relative motion.

16. In a machine-tool of the type comprising a work-piece carrier, a tool-carrier and means including at least one driving shaft to create a relative motion including a rotation component between said tool and work-piece to machine the latter, the combination with at least two coaxial bearings for said shaft, one at least of said bearings being of the type in which the shaft is floatably supported by pressure fluid in a stationary bearing surface, the same comprising a plurality of pressure zones separated by outlet grooves, of means to feed separately pressure fluid to each of said zones, a distributor operatively connected with one of said carriers and having a movable member to control the feeding of at least one of said pressure zones and means responsive to said relative motion between said tool and work-piece to actuate said movable member to thereby shift the axis of said shaft with respect to the common axis of said two bearings so as to create a fine additional component in said relative motion as a function thereof.

17. In a machine-tool of the type comprising a work-piece carrier, a tool-carrier and means including at least one driving shaft to create a relative motion including a rotation component between said tool and work-piece to machine the latter, the combination with at least two coaxial bearings for said shaft, one at least of said bearings being of the type in which the shaft is floatably supported by pressure fluid in a stationary bearing surface, the same comprising a plurality of pressure zones separated by outlet grooves, of means to feed separately pressure fluid to each of said zones, a distributor operatively connected with one of said carriers and having a movable member to control the feeding of at least one of said pressure zones and means including a reference surface, and a scanning member operatively associated with said reference surface and adapted to be responsive to said relative motion between said tool and work-piece to actuate said movable member to thereby shift the axis of said shaft with respect to the common axis of said bearings so as to create a fine additional component in said relative motion as a function of the shape of said reference surface.

18. A grinding-machine adapted to machine non-revolution curved closed surfaces comprising a work-piece-carrier, a grinding-wheel carrier, a spindle mounted on said carrier in two bearings at least one of which comprises a plurality of circumferentially spaced pressure zones separated by outlet grooves and at least two of which zones are diametrically opposed, a grinding-wheel rotatively fast with said spindle, means including feeding ducts to feed separately pressure fluid to each of said zones, a distributor operatively connected with said grinding-wheel carrier, a slidable valve member in said distributor, the axial position of which differentially controls the cross-sections of the two feeding ducts leading to said diametrically opposed pressure zones, means on said work-piece carrier to receive a work-piece and to rotate the same, a reference non-revolution curved closed surface rotatively fast with said work-piece rotating means and a scanning member cooperating with said reference surface to actuate said slidable valve member.

19. In a machine-tool of the type comprising a work-piece carrier, a tool-carrier and means including at least one driving shaft to create a relative motion including a rotation component between said tool and work-piece to machine the latter, the combination with at least two coaxial bearings for said shaft, one at least of said bearings being of the type in which the shaft is floatably supported by pressure fluid in a stationary bearing surface, the same comprising a plurality of pressure zones separated by outlet grooves, of means to feed separately pressure fluid to each of said zones, a distributor operatively connected with one of said carriers and having a rotary member to control cyclically the feeding of at least one of said pressure zones and means responsive to said rotation component of said relative motion between said tool and work-piece to rotate said rotary member to thereby shift the axis of said shaft with respect to the common axis of said bearings, so as to create a fine additional component in said relative motion as a function of said rotation component.

PAUL GERARD.
HENRI SÉRANNE.

References Cited in the file of this patent

UNITED STATES PATENTS

| Number | Name | Date |
|---|---|---|
| 2,349,690 | Arms | May 23, 1944 |
| 2,354,296 | Arms | July 25, 1944 |
| 2,387,075 | Johnson | Oct. 16, 1945 |
| 2,449,297 | Hoffer | Sept. 14, 1948 |
| 2,459,826 | Martellotti | Jan. 25, 1949 |
| 2,491,398 | Tancred | Dec. 13, 1949 |

FOREIGN PATENTS

| Number | Country | Date |
|---|---|---|
| 244,539 | Italy | Jan. 30, 1926 |